(12) United States Patent
Kumar et al.

(10) Patent No.: US 11,206,525 B2
(45) Date of Patent: Dec. 21, 2021

(54) METHOD AND APPARATUS FOR HANDLING SESSION IN A WIRELESS COMMUNICATION SYSTEM

(71) Applicant: Samsung Electronics Co., Ltd., Suwon-si (KR)

(72) Inventors: Lalith Kumar, Bengaluru (IN); Kundan Tiwari, Sitamarhi (IN); Ricky Kaura, Middlesex (GB); Anikethan Ramakrishna Vijaya Kumar, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/994,450

(22) Filed: Aug. 14, 2020

(65) Prior Publication Data

US 2021/0084475 A1  Mar. 18, 2021

(30) Foreign Application Priority Data

Aug. 14, 2019 (IN) .............................. 201941032934
Jul. 28, 2020 (IN) .............................. 201941032934

(51) Int. Cl.
*H04W 4/90* (2018.01)
*H04W 76/50* (2018.01)
(Continued)

(52) U.S. Cl.
CPC ............ *H04W 4/90* (2018.02); *H04W 60/02* (2013.01); *H04W 76/27* (2018.02); *H04W 76/50* (2018.02); *H04W 80/10* (2013.01)

(58) Field of Classification Search
CPC ....... H04W 4/90; H04W 76/27; H04W 76/50; H04W 60/02; H04W 80/10
See application file for complete search history.

(56) References Cited

U.S. PATENT DOCUMENTS

2009/0264095 A1\* 10/2009 Khetawat .............. H04W 76/12
455/404.2
2018/0376444 A1\* 12/2018 Kim ........................ H04W 4/70
(Continued)

FOREIGN PATENT DOCUMENTS

CN   110636604 A  \* 12/2019
CN   110636604 A    12/2019
(Continued)

OTHER PUBLICATIONS

International Search Report and Written Opinion of the International Searching Authority in connection with International Application No. PCT/KR2020/010726 dated Nov. 20, 2020, 9 pages.
(Continued)

*Primary Examiner* — Minjung Kim

(57) ABSTRACT

Accordingly, embodiments herein disclose a method performed by a user equipment (UE) in a wireless communication system. The method comprises receiving, from an access and mobility management function (AMF), a non-access stratum (NAS) message, wherein the non-access stratum (NAS) message includes information indicating whether the UE is registered for emergency services and determining registering for the emergency services based on the NAS message.

4 Claims, 11 Drawing Sheets

(51) Int. Cl.
*H04W 76/27* (2018.01)
*H04W 80/10* (2009.01)
*H04W 60/02* (2009.01)

(56) References Cited

U.S. PATENT DOCUMENTS

2021/0250890 A1* 8/2021 Won .................. H04W 48/16
2021/0267001 A1* 8/2021 Takakura ............ H04W 48/16

FOREIGN PATENT DOCUMENTS

WO 2019092683 A1 5/2019
WO 2019147176 A1 8/2019

OTHER PUBLICATIONS

Huawei, et al., "Correction to Configured NSSAI for the HPLMN," C1-186823, 3GPP TSG-CT WG1 Meeting #112bis, Vilnius (Lithuania), Oct. 15-19, 2018, 63 pages.
Huawei, et al., "Editorials and minor corrections," C1-188525 (was C1-188265), 3GPP TSG-CT WG1 Meeting #113, West Palm Beach (FL), USA, Nov. 26-30, 2018, 82 pages.
Mediatek Inc., et al., "Emergency registered," C1-188587 (was C1-188018), 3GPP TSG-CT WG1 Meeting #113, West Palm Beach (FL), USA, Nov. 26-30, 2018. 13 pages.

\* cited by examiner

METHOD AND APPARATUS FOR HANDLING SESSION IN A WIRELESS COMMUNICATION SYSTEM

CROSS-REFERENCE TO RELATED APPLICATIONS

This application is based on and claims priority under 35 U.S.C. § 119(a) to Indian Provisional Application Number 201941032934 filed on Aug. 14, 2019, and Indian complete Application No. 201941032934 filed on Jul. 28, 2020 in the Indian Patent Office, the disclosure of which is incorporated herein.

BACKGROUND

1. Field

The present disclosure relates to a wireless communication network, specifically to a method and User Equipment (UE) for handling a Protocol Data Unit (PDU) session when multiple PDU sessions are released in the wireless communication network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human-centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Accordingly, embodiments herein disclose a method for handling a PDU session by a UE. The method includes receiving, by the UE, a NAS message from a network entity. The NAS message indicates that the UE is registered for an emergency service. Further, the method includes performing, by the UE, an action in response to receiving the NAS message indicating that the UE is registered for the emergency service. The action comprises at least one of: the UE is registered with the network entity for at least one emergency service, release the PDU session locally corresponding to an ongoing normal service, and avoid request for a normal service to the network entity.

In an embodiment, receiving, by the UE, the NAS message from the network entity includes detecting, by the network entity, at least one of that the UE moves to a forbidden area from a normal area, current registered area is converted to forbidden area for the UE, the UE initiated registration procedure in an area where the area is not allowed to receive normal service, and receiving, by the UE, the NAS message from the network entity based on the detection.

In an embodiment, the NAS message is at least one of a UE configuration update message and a registration accept message.

In an embodiment, the network entity is an AMF entity.

Accordingly, embodiments herein disclose a UE for handling a PDU session. The UE includes a processor coupled with a memory. The processor is configured to receive a NAS message from a network entity. The NAS message indicates that the UE is registered for an emergency service. The processor is configured to perform an action in response to receiving the NAS message indicating that the UE is registered for the emergency service. The action includes at least one of: the UE is registered with the network entity for the at least one emergency service, release the PDU session locally corresponding to an ongoing normal service, and avoid a request for normal services to the network entity.

Accordingly, embodiments herein disclose a method performed by a user equipment (UE) in a wireless communication system. The method may comprise receiving, from an access and mobility management function (AMF), a non-access stratum (NAS) message, wherein the non-access stratum (NAS) message includes information indicating whether the UE is registered for emergency services. Also, the method may comprise determining registering for the emergency services based on the NAS message.

In an embodiment, the method further comprising: determining that the UE is registered for the emergency services, when the information indicates that the UE is registered for the emergency services.

In an embodiment, the method further comprising: releasing Protocol Data Unit (PDU) sessions not associated with the emergency services, when the information indicates that the UE is registered for the emergency services.

In an embodiment, the UE is not currently registered for emergency services.

Accordingly, embodiments herein disclose a method performed by an access and mobility management function (AMF) in a wireless communication system. The method comprising: transmitting, to a user equipment (UE), a non-access stratum (NAS) message, wherein the non-access stratum (NAS) message includes a information indicating whether the UE is registered for emergency services, and wherein whether the UE registers for the emergency services is determined based on the NAS message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This method and UE are illustrated in the accompanying drawings, throughout which like reference letters indicate corresponding parts in the various figures. The embodiments herein will be better understood from the following description with reference to the drawings, in which.

Throughout the drawings, like reference numerals will be understood to refer to like parts, components, and structures.

DETAILED DESCRIPTION

Figure 1:
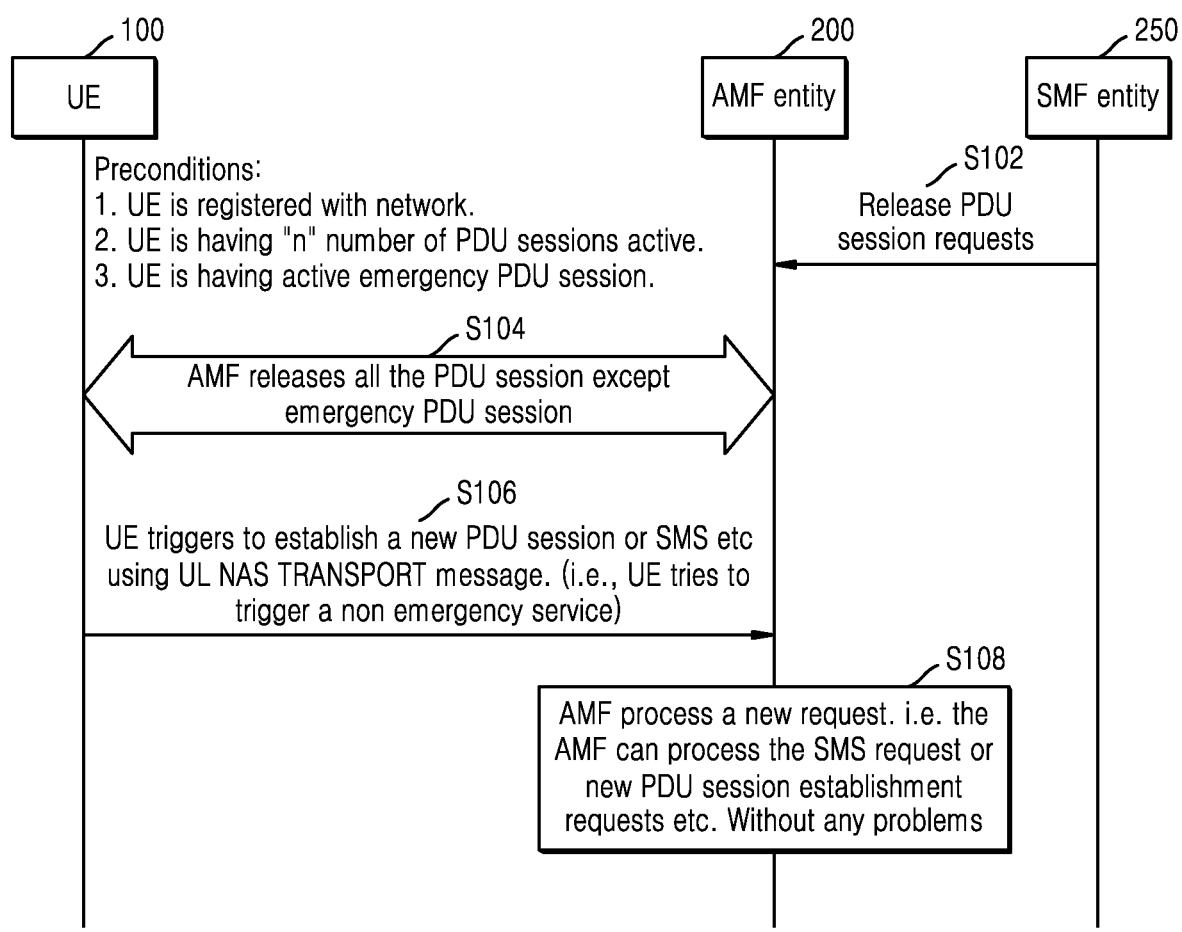
FIG. 1 is a sequence diagram illustrating a UE for handling a PDU session, when a SMF entity sends a release PDU session request to an AMF entity, according to prior art.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In the present disclosure, whenever it is mentioned that the UE shall consider itself registered only for emergency services, it implicitly means that the UE shall release locally all non-emergency bearers that have not already been explicitly deactivated by network. In other words, the UE releases the PDU session locally corresponding to an ongoing normal service. The term locally implies the UE will release the PDU session without peer to peer signaling between the UE and a network. i.e., UE (100) will release the PDU session locally without executing PDU session release procedure.

Accordingly, embodiments herein disclose a method for handling a PDU session by a UE. The method includes receiving, by the UE, a NAS message from a network entity. The NAS message indicates that the UE is registered for an emergency service. Further, the method includes performing, by the UE, an action in response to receiving the NAS message indicating that the UE is registered for the emergency service. The action comprises at least one of: the UE is registered with the network entity for at least one emergency service, release the PDU session locally corresponding to an ongoing normal service, and avoid a request for normal services to the network entity.

Unlike conventional methods and systems, in the proposed method, the AMF entity indicating to the UE in a NAS message that the UE is only registered for emergency services. Based on the indication, the UE continues to remain in a registered state but only for the emergency services and the UE shall not initiate any non-emergency related services. This results in avoiding network resource wastage.

According to the present disclosure, there is no need for UE to be in a normal service state. That is, in prior art it is not possible to receive an indication ("registered for emergency service") during the registration procedure (That is, in the prior art, receiving the indication is applicable only after registration procedure). But According to the present disclosure, receiving the indication during the registration procedure is allowed.

According to the present disclosure, no need for at least one emergency PDU session. That is the method and the apparatus disclosed in the present disclosure don't consider preserving of existing emergency PDU session.

According to the present disclosure, the method and the apparatus disclosed in the present disclosure is not dependent on subscription expiry.

Mobility and periodic registration update accepted by the network: If the UE is not currently registered for emergency services and a Fifth generation service (5GS) registration result IE value in the REGISTRATION ACCEPT message is set to "Registered for emergency services", the UE shall consider itself registered for emergency services and shall release locally PDU session(s) not associated with emergency services, if any.

Generic UE configuration update accepted by the UE: If the UE is not currently registered for emergency services and the 5GS registration result IE in the CONFIGURATION UPDATE COMMAND message is set to "Registered for emergency services", the UE shall consider itself registered for emergency services.

The principal object of the embodiments herein is to provide a method and UE for handling a PDU session when multiple PDU sessions are released in the wireless communication network.

Referring now to the drawings, and more particularly to FIGS. 1 through 11, there are shown preferred embodiments.

FIG. 1 is a sequence diagram illustrating a UE (100) for handling a PDU session, when a Session Management Function (SMF) entity (250) sends a release PDU session request to an Access and Mobility Management Function (AMF) entity (200), according to prior art.

Consider that the UE (100) is registered with a network. The UE (100) is having "n" number of PDU sessions active and an active emergency PDU session. The SMF entity (250) initiates a PDU session release procedure for the UE (100). In an example, at S102, the SMF entity (250) sends a release PDU session request to the AMF entity (200). Based on receiving the release PDU session request from the SMF entity (250), S104, the AMF entity (200) releases all the applicable PDU session except emergency PDU session. After releasing all the PDU session except emergency PDU session, at S106, the UE (100) then establish a new PDU session or SMS, etc. using an uplink (UL) Non-access stratum (NAS) transport message (i.e., the UE (100) tries to trigger a non-emergency service). Based on the UL NAS TRANSPORT message, at S108, the AMF entity (200) process a new request (i.e., the AMF entity (200) can process the SMS request or new PDU session establishment requests, etc. without any problems.

Figure 2:
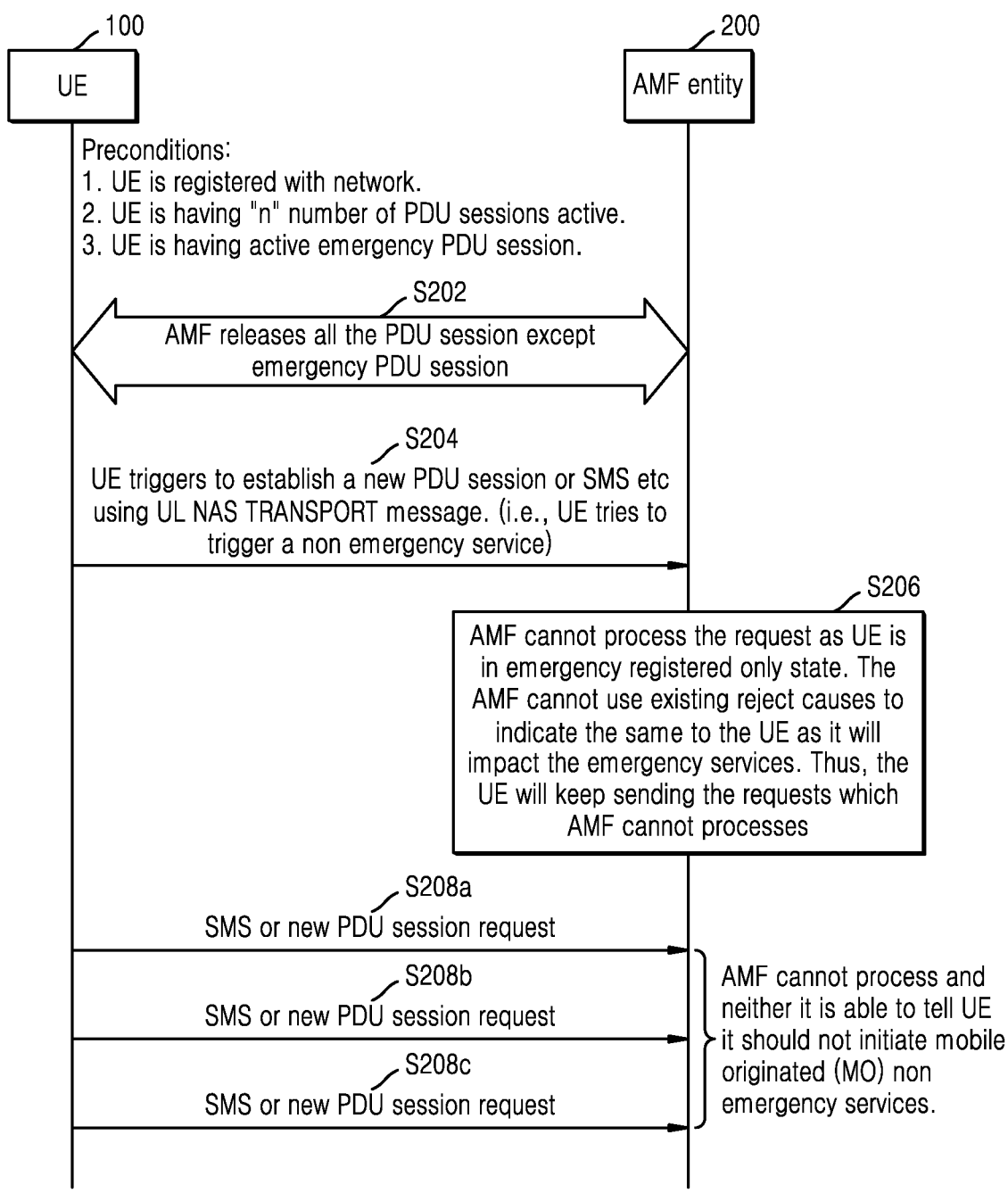
FIG. 2 is a sequence diagram illustrating the UE for handling the PDU session based on a deregistration notification, according to prior art.

FIG. 2 is a sequence diagram illustrating the UE (100) for handling the PDU session based on a deregistration notification, according to prior art.

Consider that the UE (100) is registered with the network. The UE (100) is having "n" number of PDU sessions active and active emergency PDU session.

The AMF entity (200) decides to deregister the UE (100) which can be based on receiving the deregistration notification from other entity in the wireless communication network or UEs mobility, at S202, the AMF entity (200) releases all the PDU session except emergency PDU session. At S204, the UE (100) sends a UL NAS TRANSPORT message to establishes a new PDU session or SMS (i.e., the UE (100) trigger a non-emergency service) to the AMF entity (200). After receiving the UL NAS TRANSPORT message from the UE (100), at S206, the AMF entity (200) cannot process the request as the UE (100) is in an emergency registered only state. At S208a, S208b, S208c, the AMF entity (200) cannot use existing reject causes to indicate the same to the UE (100) as the existing reject causes will impact the emergency services (i.e., if the NAS message is rejected then the UE (100) will get into deregistered state and emergency services are impacted).

Further, the UE (100) will keep sending the uplink request on expiry of retry timers, but the AMF entity (200) cannot process the requests. This will happen continuously impacting network resources.

Based on the FIGS. 1 and 2, when all the PDU sessions are released from the UE (100), the UE (100) have no idea for what purpose all the PDU sessions are released.

Thus, it is desired to address the above mentioned disadvantages or other shortcomings or at least provide a useful alternative.

Figure 3:
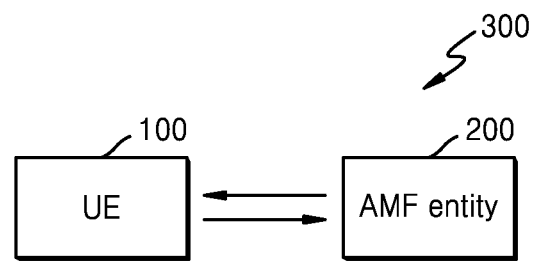
FIG. 3 is an overview of a system for handling a PDU session, according to an embodiment as disclosed herein.

FIG. 3 is an overview of a system (300) for handling a PDU session, according to an embodiment as disclosed herein.

In an embodiment, the system (300) includes a UE (100) and an AMF entity (200). The UE (100) can be, for example, but not limited to a cellular phone, a smart phone, a Personal Digital Assistant (PDA), a wireless modem, a tablet computer, a laptop computer, an Internet of Things (IoT), a virtual reality device, a smart watch or the like.

Consider, the UE (100) is registered with the network. The UE (100) is having "n" number of PDU sessions active and the UE (100) is also having active emergency PDU session.

In this disclosure, "n" number of PDU sessions may mean at least one PDU session. For example, the number of PDU sessions may be 2. For example, the number of PDU sessions may be over 2.

In an embodiment, the UE (100) moves from the normal area to the forbidden area or an emergency area. The AMF entity (200) deregister the UE (100). Based on receiving the DeregistrationNotification from other entity in the wireless communication network or AMF entity (200) by itself identifies that UE has entered the forbidden area or an emergency area or non-allowed area and like so, the AMF entity (200) releases all the PDU session except emergency PDU session. The AMF entity (200) sends a NAS message (e.g., UE configuration update or the like) to the UE (100). The NAS message includes an information element (IE) indicating that the UE (100) is registered for an emergency service. When the UE (100) receives the NAS message including the IE indicating that the UE (100) is registered for the emergency service, the UE (100) shall consider itself registered only for emergency services, release locally all the PDU sessions not related to emergency services and shall not initiate normal services for example new PDU session (related to normal service).

In another embodiment, based on receiving the Deregistration Notification or the AMF entity (200) by itself identifies that UE (100) has entered the forbidden area or the emergency area or non-allowed area and like so, the AMF entity (200) releases all the PDU session except emergency PDU session. The UE (100) triggers to establish a new PDU session or SMS using the UL NAS TRANSPORT message (i.e. the UE (100) tries to trigger a non-emergency service. The AMF entity (200) sends the NAS message (e.g., DL NAS transport message or the like) to the UE (100). The NAS message includes an information element (IE) indicating that the UE (100) is registered for the emergency service. When the UE (100) receives the NAS message including the IE indicating that the UE (100) is in the registered for the emergency service, release locally all the PDU sessions not related to emergency services, the UE (100) shall consider itself registered only for emergency services and shall not initiate normal services for example new PDU session (related to normal service).

In another embodiment, based on receiving the Deregistration Notification or the AMF entity (200) by itself identifies that UE (100) has entered the forbidden area or an emergency area or non-allowed area and like so, the AMF entity (200) releases all the PDU session except emergency PDU session. As part of the PDU session release procedure, the AMF entity (200) sends the IE indicating that the UE (100) is registered for the emergency service. When the UE (100) receives the NAS message including the IE indicating that the UE (100) is registered for the emergency service, release locally all the PDU sessions not related to emergency services, the UE (100) shall consider itself registered only for emergency services and shall not initiate normal services for example new PDU session (related to normal service).

Figure 4:
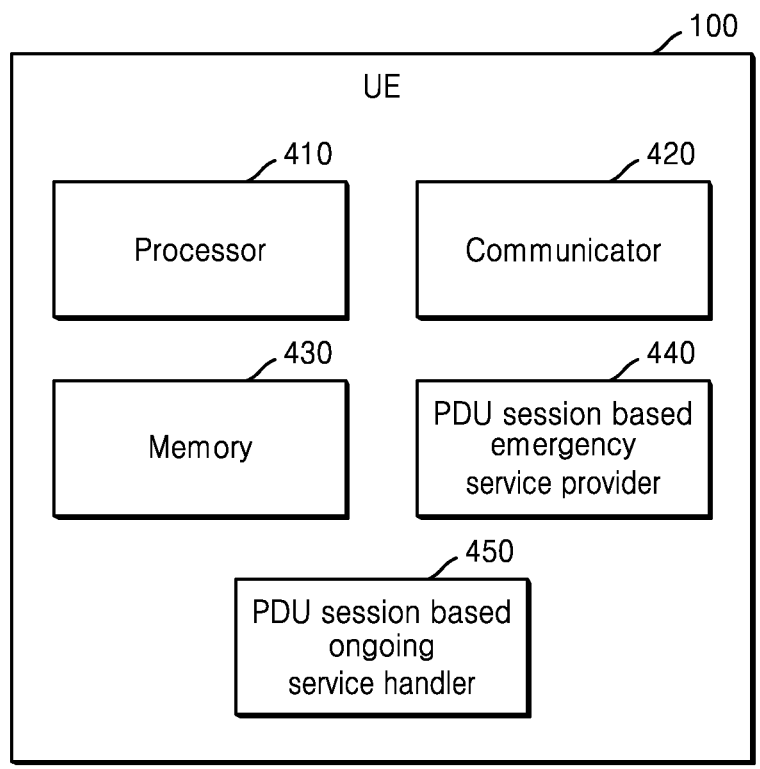
FIG. 4 shows various hardware components of a UE for handling the PDU session, according to an embodiment as disclosed herein.

FIG. 4 shows various hardware components of the UE (100), according to an embodiment as disclosed herein.

In an embodiment, the UE (100) includes a processor (410), a communicator (420) a memory (430), a PDU session based emergency service provider (140), and a PDU session based ongoing service handler (150). The processor (410) is coupled with the communicator (420), the memory (430), the PDU session based emergency service provider (140), and the PDU session based ongoing service handler (150).

In an embodiment, the processor (410) is configured to receive the NAS message from the network entity (i.e., AMF entity (200)). The NAS message indicates that the UE (100) is registered for the emergency service. The NAS message can be, for example, but not limited to a UE configuration update, a DL NAS transport message, a deregister message, a registration accept message or the like.

In response to receiving the NAS message indicating that the UE (100) is registered for the emergency service, the PDU session based emergency service provider (140) is configured to register with the network entity for the at least one emergency service.

In response to receiving the NAS message indicating that the UE (100) is registered for the emergency service, the PDU session based ongoing service handler (150) is configured to release locally the PDU session corresponding to the ongoing normal service In response to receiving the NAS message indicating that the UE (100) is registered for the emergency service, the PDU session based ongoing service handler (1150) is configured to avoid the request for normal services to the network entity.

The processor (410) is configured to execute instructions stored in the memory (430) and to perform various processes. The communicator (420) is configured for communicating internally between internal hardware components and with external devices via one or more networks.

Further, the memory (430) also stores instructions to be executed by the processor (410). The memory (430) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (430) may, in some examples, be considered a non-transitory storage medium. The term "non-transitory" may indicate that the storage medium is not embodied in a carrier wave or a propagated signal. However, the term "non-transitory" should not be interpreted that the memory (430) is non-movable. In some examples, the memory (430) can be configured to store larger amounts of information than the memory. In certain examples, a non-transitory storage medium may store data that can, over time, change (e.g., in Random Access Memory (RAM) or cache).

Although the FIG. 4 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function to handle the PDU session.

Figure 5:
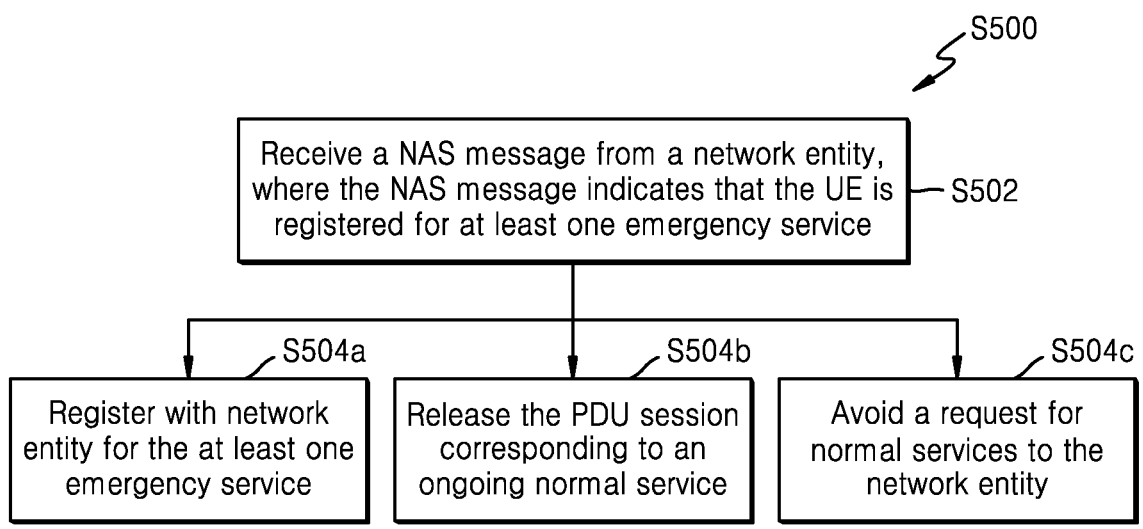
FIG. 5 is a flow chart illustrating a method for handling the PDU session according to embodiments of the present disclosure.

FIG. 5 is a flow chart (S500) illustrating a method for handling the PDU session, according to an embodiment as disclosed herein. The operations (S502, S504a, S504b, S504c) are performed by the processor (410). At S502, the method includes receiving the NAS message from the network entity (i.e., AMF entity (200)). The NAS message indicates that the UE (100) is registered for the emergency service. At S504a, the method includes registering with the network entity for the at least one emergency service in response to receiving the NAS message indicating that the UE (100) is registered for the emergency service. At S504b, the method includes releasing the PDU session corresponding to the ongoing normal service in response to receiving the NAS message indicating that the UE (100) is registered for the emergency service. At S504c, the method includes avoiding the request for normal services to the network entity in response to receiving the NAS message indicating that the UE (100) is registered for the emergency service.

The various actions, acts, blocks, steps, or the like in the flow chart (S500) may be performed in the order presented, in a different order or simultaneously. Further, in some embodiments, some of the actions, acts, blocks, steps, or the like may be omitted, added, modified, skipped, or the like without departing from the scope of the invention.

Figure 6:
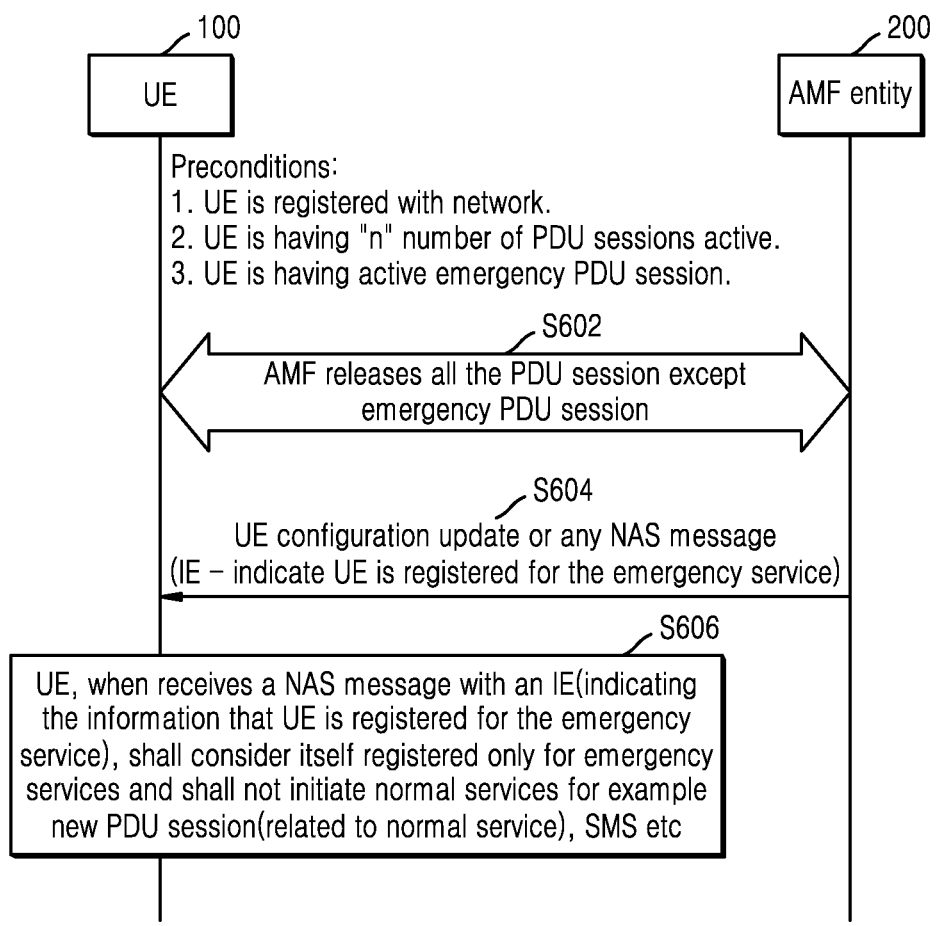
FIG. 6 is a sequence diagram illustrating the UE for handling the PDU session when the AMF entity sends a NAS message indicating that the UE is registered for an at least one emergency service, according to an embodiment as disclosed herein.

FIG. 6 is a sequence diagram illustrating the UE (100) for handling the PDU session, when the AMF entity (200) sends the NAS message indicating that the UE (100) is registered for the at least one emergency service, according to an embodiment as disclosed herein.

Consider, the UE (100) is registered with the network. The UE (100) is having "n" number of PDU sessions active and the UE (100) is also having active emergency PDU session. The DeregistrationNotification is sent due to the UE (100) has entering the forbidden area or an emergency area or non-allowed area and like so. Based on receiving the DeregistrationNotification from other entity in the wireless communication network or the AMF entity (200) by itself identifies that the UE (100) has entered the forbidden area or an emergency area or non-allowed area and like so, the AMF entity (200) releases all the PDU session except emergency PDU session at S602. At S604, the AMF entity (200) sends a NAS message (e.g., UE configuration update or the like) to the UE (100). The NAS message includes an information element (IE) indicating that the UE (100) is registered for the emergency service. At S606, when the UE (100) receives the NAS message including the IE indicating that the UE (100) is registered for the emergency service, the UE (100) shall consider itself registered only for emergency services, release locally all the PDU sessions not related to emergency services and shall not initiate normal services for example new PDU session (related to normal service).

Figure 7:
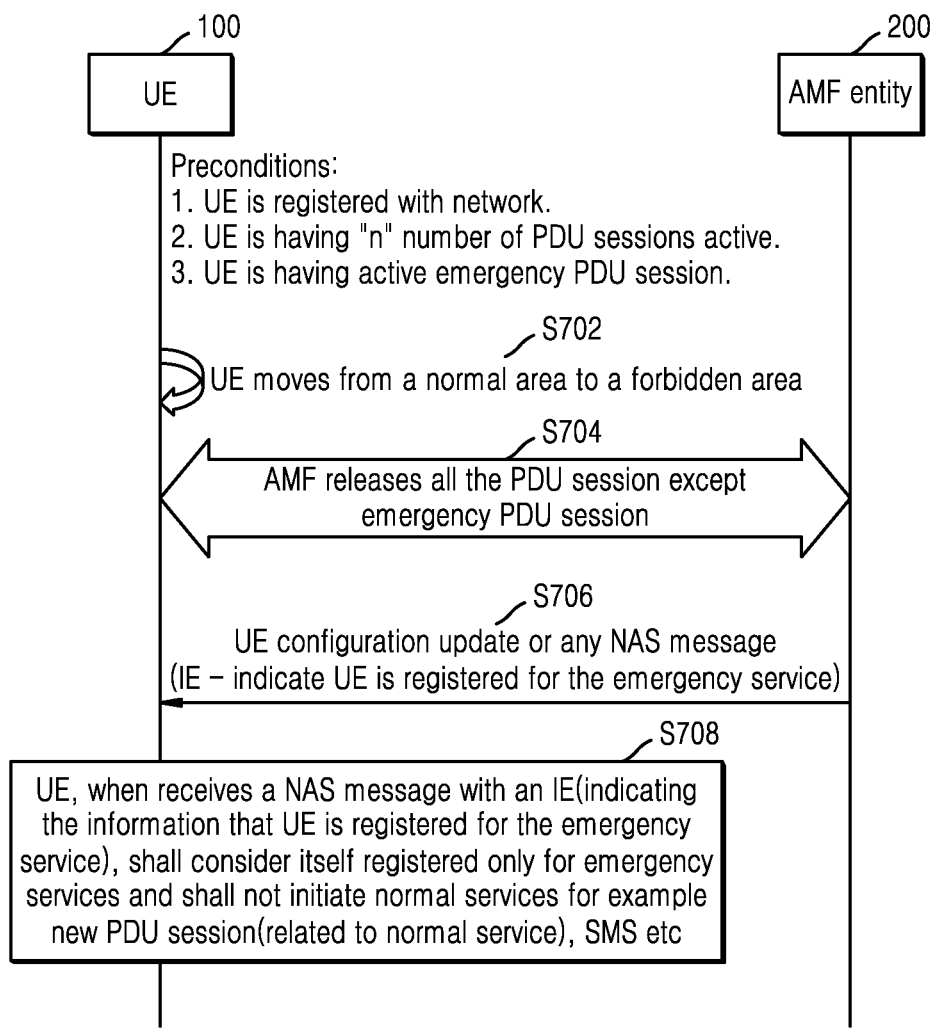
FIG. 7 is a sequence diagram illustrating the UE for handling the PDU session when the AMF entity sends the NAS message indicating that the UE is registered for the at least one emergency service and the UE moves from a normal area to an emergency area, according to an embodiment as disclosed herein.

FIG. 7 is a sequence diagram illustrating the UE (100) for handling the PDU session, when the AMF entity (200) sends the NAS message indicating that the UE (100) is registered for the at least one emergency service and the UE (100) moves from the normal area to the forbidden area or emergency area, according to an embodiment as disclosed herein.

Consider, the UE (100) is registered with the network. The UE (100) is having "n" number of PDU sessions active and the UE (100) is also having active emergency PDU session. At S702, the UE (100) moves from the normal area to the forbidden area or the current normal area is converted to the forbidden area. The AMF entity (200) receives the de-registration procedure for the UE (100). Based on receiving the DeregistrationNotification, the AMF entity (200) by itself identifies that the UE (100) has entered the forbidden area or the emergency area or the non-allowed area and like so, the AMF entity (200) releases all the PDU session except emergency PDU session at S704. At S706, the AMF entity (200) sends the NAS message (e.g., UE configuration update or the like) to the UE (100). The NAS message includes an information element (IE) indicating that the UE (100) is registered for the emergency service. At S708, when the UE (100) receives the NAS message including the IE indicating that the UE (100) is registered for the emergency service, releases locally all the PDU sessions not related to emergency services, the UE (100) shall consider itself registered only for emergency services and shall not initiate normal services for example new PDU session (related to normal service).

The procedure of the FIG. 7 also applicable for the current registered area converted to forbidden area for the UE (100), the UE (100) initiated a registration procedure in an area where the area is not allowed to receive normal service.

Figure 8:
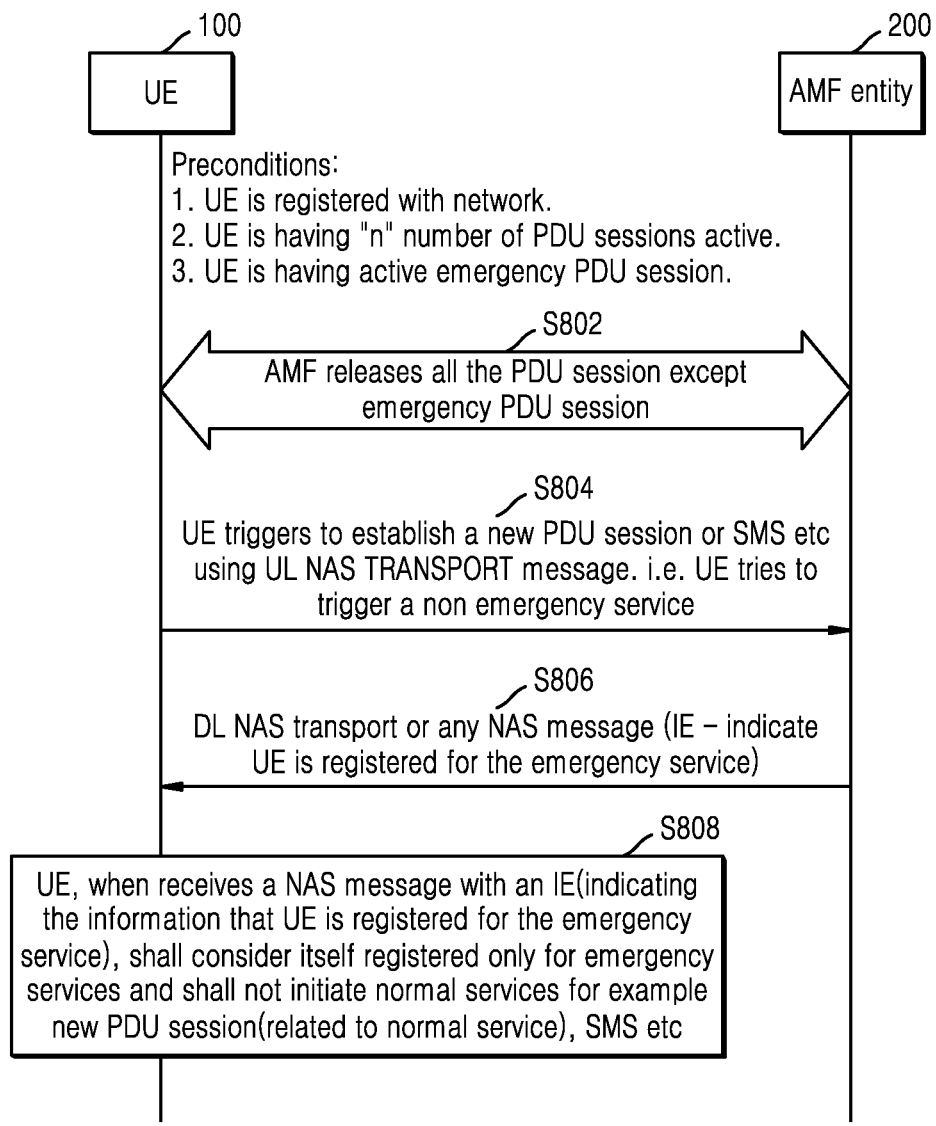
FIG. 8 is another sequence diagram illustrating the UE for handling the PDU session when the UE trying to trigger a non-emergency service and the AMF entity sends the NAS message indicating that the UE is registered for the at least one emergency service, according to an embodiment as disclosed herein.

FIG. 8 is another sequence diagram illustrating the UE (100) for handling the PDU session, when the UE (100) trying to trigger the non-emergency service and the AMF entity (200) sends the NAS message indicating that the UE (100) is registered for the at least one emergency service, according to an embodiment as disclosed herein.

Consider, the UE (100) is registered with the network. The UE (100) is having "n" number of PDU sessions active and active emergency PDU session. The AMF entity (200) receives the de-registration procedure for the UE (100). Based on receiving the DeregistrationNotification from other entity in the wireless communication network or the AMF entity (200) by itself identifies that the UE (100) has entered the forbidden area or an emergency area or non-allowed area and like so, the AMF entity (200) releases all the PDU session except emergency PDU session at S802. At S804, the UE (100) triggers to establish a new PDU session or SMS using the UL NAS TRANSPORT message (i.e. the UE tries to trigger a non-emergency service. At S806, the AMF entity (200) sends the NAS message (e.g., DL NAS transport message or the like) to the UE (100). The NAS message includes an information element (IE) indicating that the UE (100) is registered for the emergency service. At S808, when the UE (100) receives the NAS message including the IE indicating that the UE (100) is registered for the emergency service, the UE (100) shall consider itself registered only for emergency services and shall not initiate normal services for example new PDU session (related to normal service).

Figure 9:
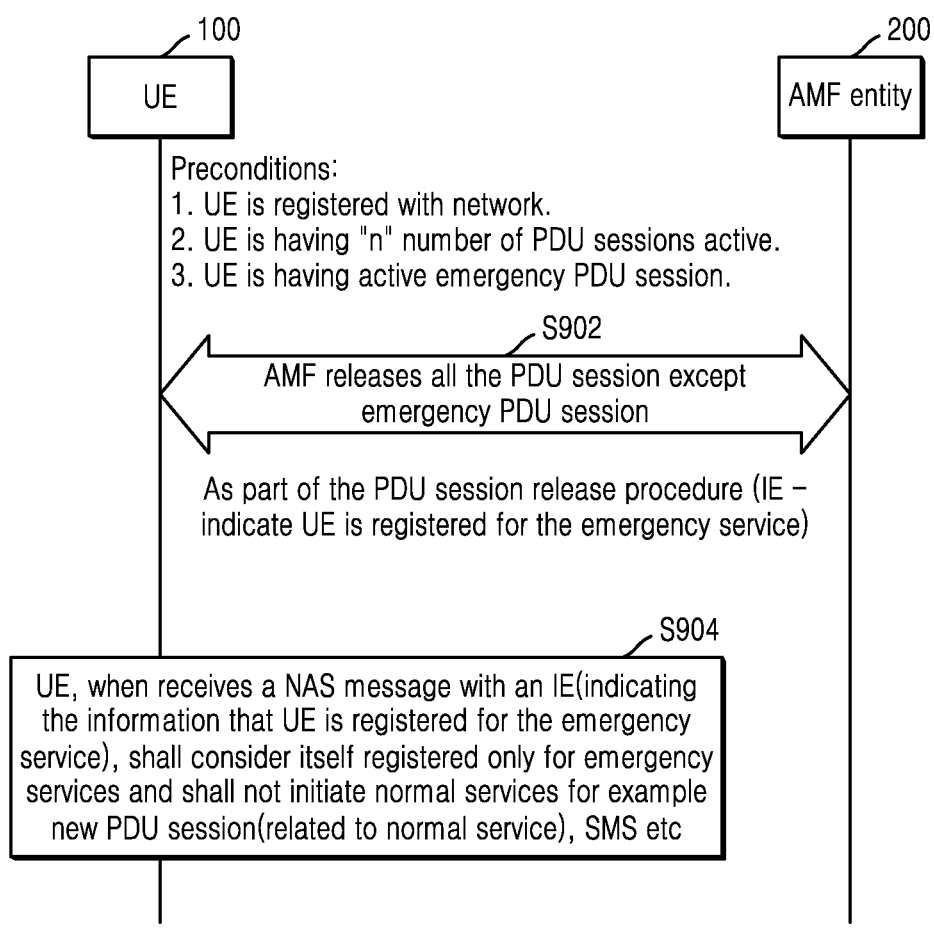
FIG. 9 is another sequence diagram illustrating the UE for handling the PDU session when the AMF entity indicates that the UE is registered for the at least one emergency service as part of PDU session release procedure, according to an embodiment as disclosed herein.

FIG. 9 is another sequence diagram illustrating the UE (100) for handling the PDU session, when the AMF entity (200) indicates that the UE (100) is registered for the at least one emergency service as part of PDU session release procedure, according to an embodiment as disclosed herein.

Consider, the UE (100) is registered with the network. The UE (100) is having "n" number of PDU sessions active and the UE (100) is also having active emergency PDU session. The AMF entity (200) receives the de-registration procedure for the UE (100). Based on receiving the DeregistrationNotification from other entity in the wireless communication network or the AMF entity (200) by itself identifies that the UE (100) has entered the forbidden area or an emergency area or non-allowed area and like so, the AMF entity (200) releases all the PDU session except emergency PDU session at S902. As part of the PDU session release procedure, the AMF entity (200) sends the IE indicating that the UE (100) is registered for the emergency service. At S904, when the UE (100) receives the NAS message including the IE indicating that the UE (100) is registered for the emergency service, the UE (100) shall consider itself registered only for emergency services and shall not initiate normal services for example new PDU session (related to normal service).

In yet another embodiment, when all the normal PDU sessions are released by the network, the UE (100) can trigger registration procedure with the network and as a response to a registration message, the network can indicate in the NAS message to the UE (100) that the UE (100) is either registered only for emergency services or the UE (100) continue to avail normal services.

In yet another embodiment, when the AMF entity (220) receives the UL NAS TRANSPORT with a message not for emergency services or SMS or control plane data i.e. the UE (100) has triggered a procedure to initiate for normal service then the AMF entity (200) can neglect this message if the AMF entity (200) is in an emergency registered state for that UE (100).

Consider, the pre-condition to initiate deregister procedure by AMF entity (200) is after the wireless network initiates deregistration procedure. This should be considered as an example. This is also applicable when other core network elements including the AMF entity (200) meets with a trigger condition to perform deregister procedure but will not be able to initiate deregister procedure as at least one emergency PDU session is active.

Consider, whenever it is mentioned that the UE (100) shall consider itself registered only for emergency services, it implicitly means that the UE (100) shall release locally all non-emergency bearers that have not already been explicitly deactivated by network. i.e. releases the PDU session locally corresponding to an ongoing normal service. The term locally implies the UE (100) will release the PDU session without peer to peer signaling between the UE (100) and network. i.e., UE (100) will release the PDU session locally without executing PDU session release procedure.

Figure 10:
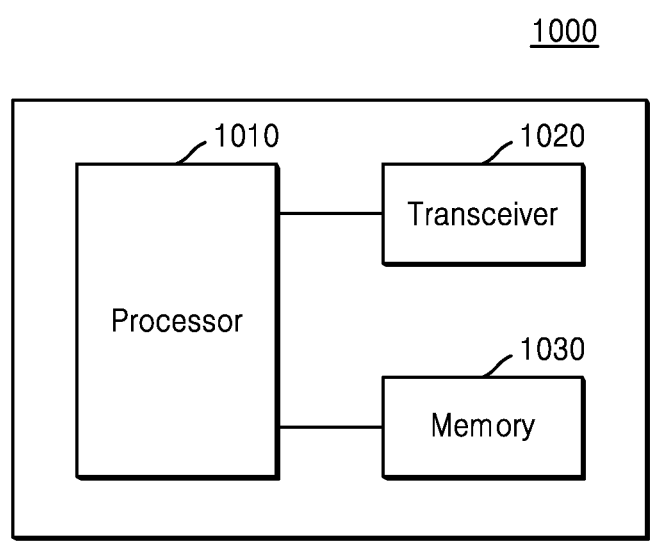
FIG. 10 schematically illustrates the network entity according to an embodiment of the disclosure.

FIG. 10 schematically illustrates the network entity according to an embodiment of the disclosure.

The network entity 100 may correspond to the AMF (for example, the AMF entity 200).

Referring to the FIG. 10, the network entity 1000 may include a processor 1010, a transceiver 1020 and a memory 1030. However, all of the illustrated components are not essential. The network entity 1000 may be implemented by more or less components than those illustrated in FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operation of the network entity 1000 may be implemented by the processor 1010.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the network entity 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

In an embodiment, the transceiver 1020 may transmit, to a User Equipment (UE), at least one signal for selecting a plurality of non-CAG cells available in a location of the UE, connect to the UE based on the at least one signal and provide at least one emergency service to the UE.

In an embodiment, the transceiver 1020 may be configured to transmit, to a user equipment (UE), a non-access stratum (NAS) message, wherein the non-access stratum (NAS) message may include a information indicating whether the UE is registered for emergency services and wherein whether the UE registers for the emergency services may be determined based on the NAS message.

In an embodiment, the UE may be determined registered for the emergency services, when the information indicates that the UE is registered for the emergency services.

In an embodiment, Protocol Data Unit (PDU) sessions not associated with the emergency services may be released, when the information indicates that the UE is registered for the emergency services.

In an embodiment, the UE may be not currently registered for emergency services.

Figure 11:
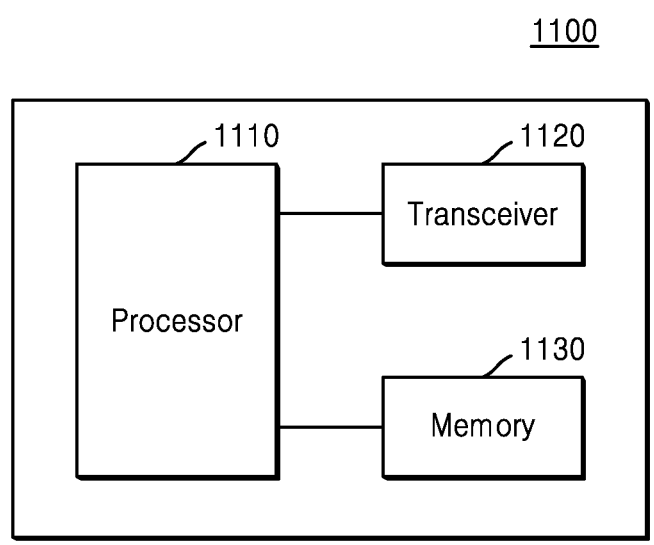
FIG. 11 schematically illustrates a user equipment (UE) according to an embodiment of the disclosure.

FIG. 11 schematically illustrates a user equipment (UE) according to an embodiment of the disclosure.

Referring to the FIG. 11, the UE 1100 may include a processor 1110, a transceiver 1120 and a memory 1130. However, all of the illustrated components are not essential. The UE 1100 may be implemented by more or less components than those illustrated in FIG. 11. In addition, the processor 1110 and the transceiver 1120 and the memory 1130 may be implemented as a single chip according to another embodiment.

The aforementioned components will now be described in detail.

The processor 1110 may include one or more processors or other processing devices that control the proposed function, process, and/or method. Operation of the UE 1100 may be implemented by the processor 1110.

The transceiver 1120 may include a RF transmitter for up-converting and amplifying a transmitted signal, and a RF receiver for down-converting a frequency of a received signal. However, according to another embodiment, the transceiver 1120 may be implemented by more or less components than those illustrated in components.

The transceiver 1120 may be connected to the processor 1110 and transmit and/or receive a signal. The signal may include control information and data. In addition, the transceiver 1120 may receive the signal through a wireless channel and output the signal to the processor 1110. The transceiver 1120 may transmit a signal output from the processor 1110 through the wireless channel.

The memory 1130 may store the control information or the data included in a signal obtained by the UE 1100. The memory 1130 may be connected to the processor 1110 and store at least one instruction or a protocol or a parameter for the proposed function, process, and/or method. The memory 1130 may include read-only memory (ROM) and/or random access memory (RAM) and/or hard disk and/or CD-ROM and/or DVD and/or other storage devices.

In an embodiment, the processor 1110 may be configured to receive, from an access and mobility management function (AMF), a non-access stratum (NAS) message, wherein the non-access stratum (NAS) message includes information indicating whether the UE is registered for emergency services. The processor 1110 may be configured to determine registering for the emergency services based on the NAS message.

In an embodiment, the processor 1110 may be further configured to determine that the UE is registered for the emergency services, when the information indicates that the UE is registered for the emergency services.

In an embodiment, the processor 1110 may be further configured to release Protocol Data Unit (PDU) sessions not associated with the emergency services, when the information indicates that the UE is registered for the emergency services.

In an embodiment, the UE may be not currently registered for emergency services.

The embodiments disclosed herein describe methods and systems for handling emergency services in a wireless network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

Although the present disclosure has been described with various embodiments, various changes and modifications may be suggested to one skilled in the art. It is intended that the present disclosure encompass such changes and modifications as fall within the scope of the appended claims The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   receiving, from an access and mobility management function (AMF), a non-access stratum (NAS) message, wherein the NAS message includes information on a registration result of the UE;
   determining that the UE is only registered for at least one emergency service according to the information on the registration result in case that the NAS message indicates that the UE is registered for the at least one emergency service as the registration result; and
   in response to determining, releasing protocol data unit (PDU) sessions not associated with the emergency services.

2. A method performed by an access and mobility management function (AMF) in a wireless communication system, the method comprising:
   releasing protocol data unit (PDU) sessions not associated with emergency services;
   as part of the PDU sessions release procedure, generating a non-access stratum (NAS) message including information on a registration result of a user equipment (UE), wherein the NAS message indicates whether the UE is registered for at least one emergency service; and
   transmitting, to the UE, the NAS message,
   wherein the UE is determined to be only registered for the at least one emergency service according to the information on the registration result, in case that the NAS message indicates that the UE is registered for the at least one emergency service as the registration result.

3. A user equipment (UE), the UE comprising:
   a transceiver; and
   at least one of processor coupled with the transceiver and configured to:
      receive, from an access and mobility management function (AMF), a non-access stratum (NAS) message, wherein the NAS message includes information on a registration result of the UE,
      determine that the UE is only registered for at least one emergency service according to the information on a registration result, in case that the NAS message indicates that the UE is registered for the at least one emergency service as the registration result, and
      in response to determining, release protocol data unit (PDU) sessions not associated with the emergency services.

4. An access and mobility management function (AMF), the AMF comprising:
   a transceiver; and
   at least one of processor coupled with the transceiver and configured to:
      release protocol data unit (PDU) sessions not associated with emergency services,
      as part of the PDU sessions release procedure, generate a non-access stratum (NAS) message including information on a registration result of a user equipment (UE), wherein the NAS message indicates whether the UE is registered for at least one emergency service, and
      transmit, to the UE, the NAS message,
   wherein UE is determined registered for the at least one emergency service according to the information on the registration result, in case that the NAS message indicates that the UE is registered for the at least one emergency service as the registration result.

* * * * *